United States Patent [19]
Baylor

[11] 3,948,573
[45] Apr. 6, 1976

[54] CRAWLER TRACTOR TRACK CHAIN DRIVE ASSEMBLY

[75] Inventor: John M. Baylor, Bettendorf, Iowa

[73] Assignee: J. I. Case Company, Racine, Wis.

[22] Filed: June 19, 1975

[21] Appl. No.: 588,407

[52] U.S. Cl. .................. 305/57; 305/54; 305/46; 305/39
[51] Int. Cl.² ........................................ B62D 55/08
[58] Field of Search.......... 305/21, 26, 35 R, 35 EB, 305/38, 39, 41, 46, 51, 54, 55, 56, 57, 60; 74/245 R, 245 LP, 247, 250 R, 250 S, 245 S

[56] References Cited
UNITED STATES PATENTS

| | | | |
|---|---|---|---|
| 3,563,614 | 2/1971 | Parks | 305/57 |
| 3,887,244 | 6/1975 | Haslett | 305/57 |
| 3,897,980 | 8/1975 | Dester | 305/57 |

Primary Examiner—Allen N. Knowles
Assistant Examiner—D. W. Keen
Attorney, Agent, or Firm—Arthur J. Hansmann

[57] ABSTRACT

A crawler tractor track chain drive assembly including a drive sprocket and a track chain having links and a track plate. An elastomeric member is confined between the links and the plate, but free of any screws or other fasteners for holding the member in the chain, and presenting the member for engagement by the sprocket in driving the chain.

8 Claims, 3 Drawing Figures

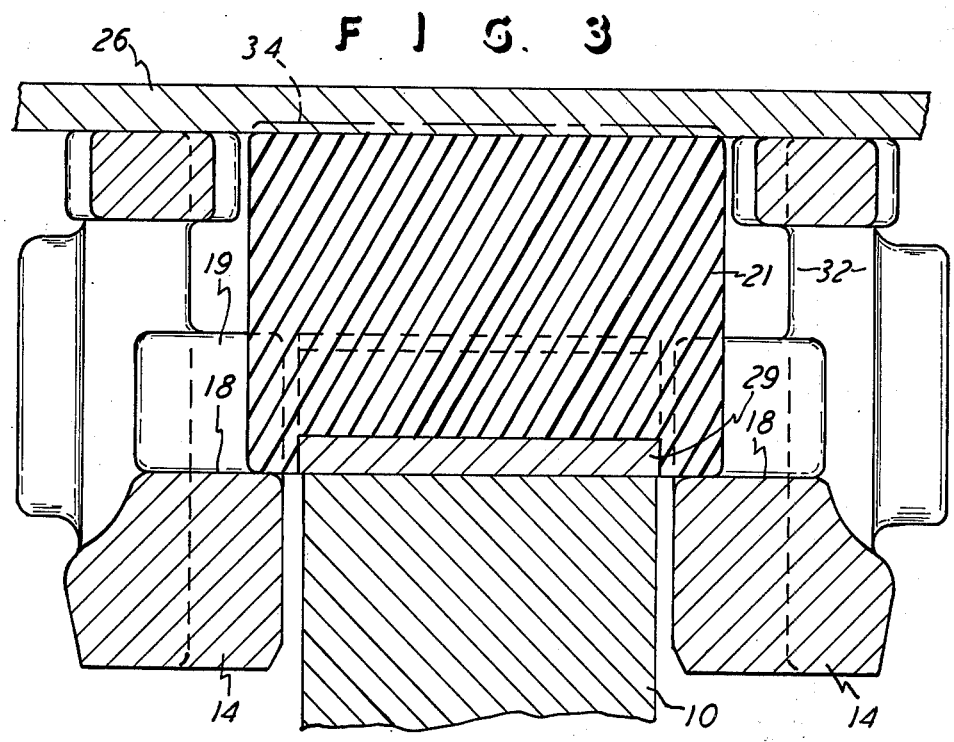

CRAWLER TRACTOR TRACK CHAIN DRIVE ASSEMBLY

This invention relates to a crawler tractor track chain drive assembly, and, more particularly, it relates to the assembly which includes the type having the central bushing member engaged by the sprocket for driving the chain.

BACKGROUND OF THE INVENTION

Crawler tractor track chain drive assemblies are commonly used in industry, and they include links which are pinned together and which have track plates for engaging the ground and with the track chain being engaged by sprocket teeth for driving the track chain in advancing the tractor over the ground. One isolated example of that general type of prior art is found in U.S. Pat. No. 3,588,195 wherein the sprocket directly engages bushings surrounding the pins which hold the links together. In that prior art, the problem is related to the fact that the sprocket directly contacts the chain bushings, and this causes wear and unnecessary noise and the life and actual efficiency of the assembly is not as great as that possible with the present invention.

Other prior art examples of track chain assemblies are found in U.S. Pat. Nos. 3,563,614 and 3,567,294 and 3,680,929. In those three patents, there are teachings of arranging a track chain with a midpoint driving lug which is engaged by the sprocket for advancing the tractor over the ground. However, in those prior art arrangements, the driving lugs shown therein are of a rigid material and they all require positioning and bolting in the track chain. Also, U.S. Pat. Nos. 1,638,140 and 3,854,345 show track chain assemblies which have resilient pieces included therein, though the resilient pieces are shown mounted on the sprocket of the assembly, and the showings are not of an assembly which has a so-called midpitch or point drive which utilizes the lug on the track chain.

The present invention provides an improvement over the crawler tractor track chain drive assemblies heretofore known, and, more particularly, it provides a drive arrangement of the type having the center or midpitch drive bushing on the track chain and having the advantages of an efficient drive relation between the chain and the sprocket, in that a large number of the sprocket teeth can engage the chain in full drive at all times, and shock loads are reduced and there is less noise, all of which is achieved by an assembly made according to this invention.

The present invention specifically provides a crawler tractor track chain drive assembly which utilizes the center-mounted drive bushing on the track chain but which does not require that the bushing be bolted, screwed, or otherwise fastened to the chain, and, further, the bushing of this invention is of an elastomeric material which permits the bushing to adapt and adjust to both the track chain and to the teeth of the engaging sprocket, all for the purpose of providing an improved and more efficient drive to the track chain.

Still further, the present invention achieves the aforementioned advantages and objectives and it does so with an assembly which is readily and easily provided and achieved and which can be readily and easily maintained, and even repaired when necessary, and which does not require any special machining such as threading and provision for screws, and it permits readily and easily converting the drive from the center-mounted drive bushing to the conventional track chain bushing drive, and it even permits reversing the center-mounted drive bushing for distributing wear on the bushing.

Other objects and advantages will become apparent upon reading the following description in light of the accompanying drawings.

BRIEF DESCRIPTION OF THE DRAWINGS

FIG. 3 is a sectional view taken along the line 3—3 of FIG. 2.

DETAILED DESCRIPTION OF THE PREFERRED EMBODIMENT

Figure 2:
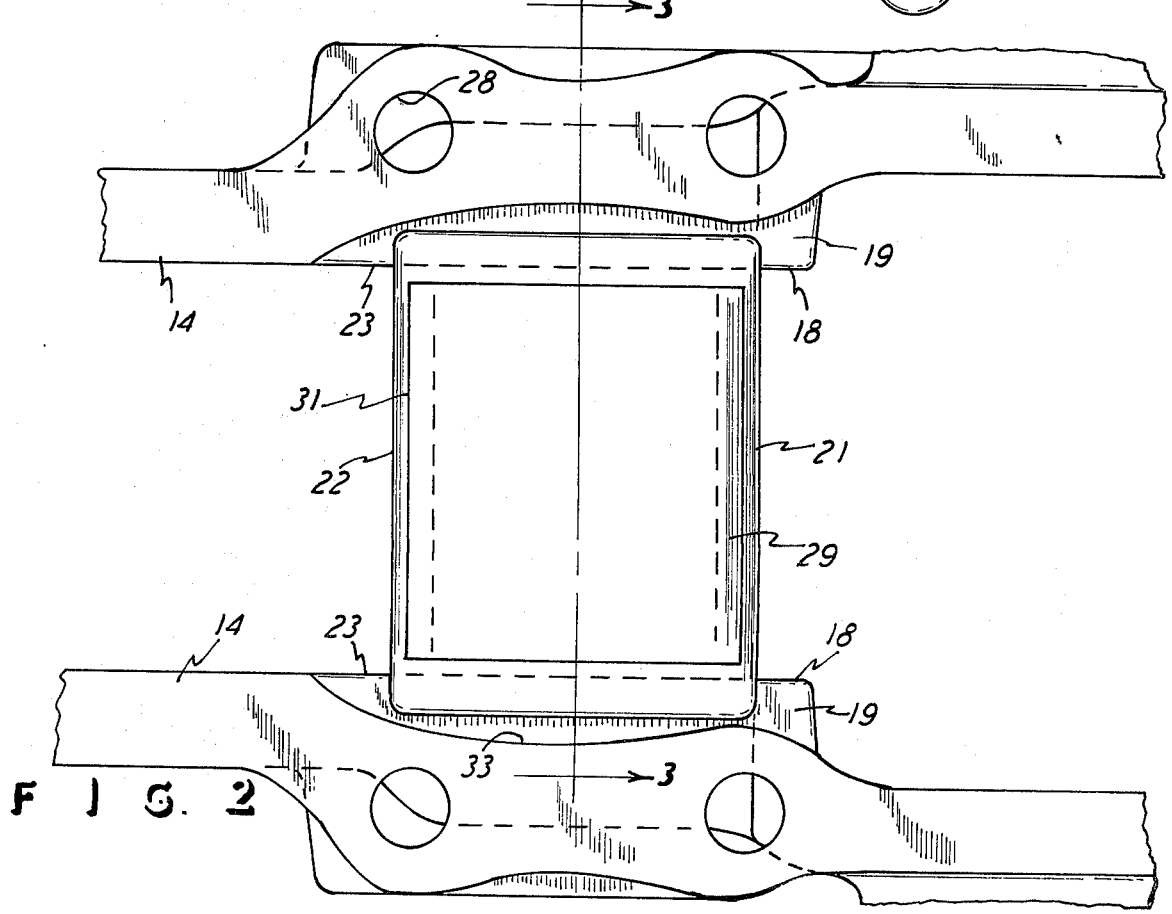
FIG. 2 is a bottom planned view of the assembly shown in FIG. 1, with the track plate thereof removed.

The drawings show the assembly of this invention, and there is the usual drive sprocket 10, which is fragmentarily shown and has its teeth 11 and its intervening tooth spaces 12, as shown and indicated. The assembly also includes the track chain, generally designated 13 and having a plurality of links 14 which are pivotally secured together by the usual pins 16 and bushings 17. The links 14 are disposed in groupings of two links which are spaced apart laterally of the longitudinal extent of the chain, as seen in FIG. 2, and the two links are thus disposed in pairs of links. The overall and general assembly is therefore of the usual and well-known construction, to the point described thus far, and, further, it is also generally of the type disclosed in U.S. Pat. No. 1,638,140 which shows a sprocket and a track chain consisting of paired links and pins and bushings connecting the links together in the track chain.

Figure 1:
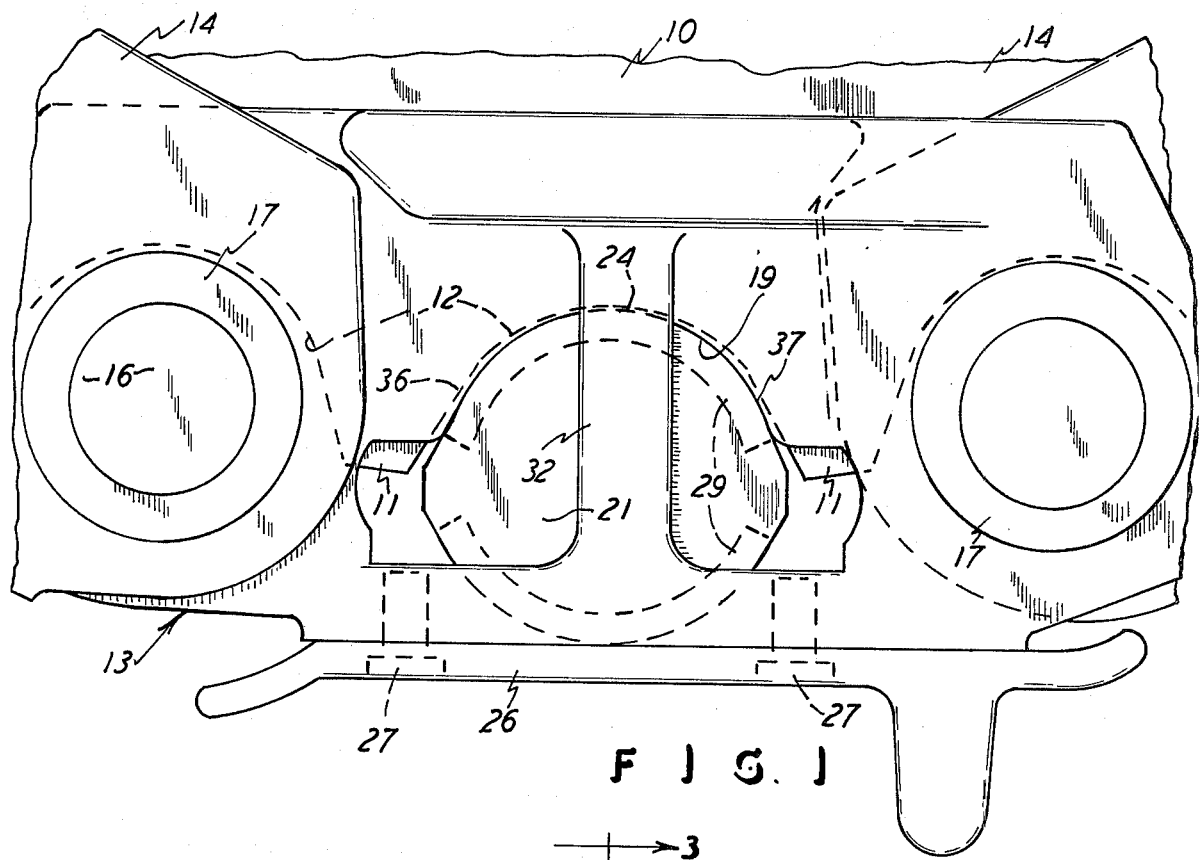
FIG. 1 is a side elevational view of a fragment of the assembly made according to this invention.

The links 14 include flanges 18 extending from the mid-portion of the link 14 and inwardly toward the longitudinal centerline of the track chain, as seen in FIG. 2, and the flanges present surfaces 19 which are faced upwardly, as seen in FIG. 2. An elastomeric bushing member 21 is disposed between the links 14 and rests on the flanged surfaces 19, as shown in the drawings, and the bushing 21 has a length, along the line designated 22 for definition, greater than the spacing between the flange inner surfaces designated 23, and thus the bushing 21 will rest on the flanges 18, as shown and described. Also, the bushing surface which is radially inwardly relative to the sprocket 10, and that surface being designated 24 in FIG. 1, is disposed, by virtue of the location of the flange surfaces 19, to be engageable by the sprocket 10 at the surface of the sprocket which defines the sprocket tooth spacings 12. Also, it will be seen that the profile of the bushing 21, along its surface 24, is the same as the profile of the sprocket surface defining the tooth spacings 12, and thus the surfaces are matching and similar for full and firm engagement of the bushing 21 by the sprocket 10. Thus the sprocket 10 engages the bushing 21 without engaging the usual metal or steel bushings 17 used in driving the chain 13.

However, it will be readily seen and understood that the bushing 21 can be removed from the track chain, and the sprocket will then drive the chain by engaging the bushings 17, in the usual manner.

The track chain also includes the track plate 26 which is commonly bolted to the links 14, and fasteners or screws 27 are shown holding the plate 26 to the links 14, and those fasteners would enter the threaded holes 28 shown in FIG. 2. The track plate 26 thus spans the spaced-apart links 14 and thereby retains the bushing 21 against movement out of position and in the direction of the track plate 26. In actuality, the cross sectional size of the bushing 21 can be such that the track plate 26 will actually compress the bushing 21 onto the flange surfaces 19 and into the position shown in FIG. 1, and it will also be noted that the flange surfaces 19 are shaped to conform to the profile of the bushing surface 24, as designated and shown in FIG. 1.

The bushing 24 is thus made of an elastomeric material, such as rubber, and it thereby achieves the advantages mentioned at the outset of this document. Further, the bushing 21 may include steel or other hard material utilized as backing pieces or inserts, such as the semicircularly-shaped pieces 29 which are shown embedded in the bushing 21 and extend on opposite sides thereof. Of course there may be only one arcuate piece 29 on one side of the elastomeric member 21, and they may be bonded together in the usual manner of bonding rubber to metal. It will also be noticed that the piece 29 does not extend for the full length of the distance between the flange surfaces 23, as designated by the line 31 along the edge of the piece 29 in FIG. 2, and thus the piece 29 is not shown to be in contact with the links 14. The member 21 may be reversable, as well as invertible, from its position shown in FIG. 1, and this is especially true when the bushing 21 has the diametrically oppositely disposed backing pieces 29, as indicated in FIG. 1. However, FIG. 3 shows the piece 21 with only one backing piece 29, as an alternative construction.

The elastomeric member 21 is thus compressed into position, particularly by the track plate 26 being fastened or bolted to the links 14. The flanges 18 therefore provide a saddle or define a portion of a pocket in which the elastomeric member 21 is securely disposed for purposes of making the drive connection between the sprocket and the track chain 13. That is, the links 14, along with their flanges 18, and the track plate 26, all define an opening or pocket in which the elastomeric member 21 is disposed, and there would be one such member on each pair of links 14 throughout the entire length of the track chain. Thus, when the sprocket 10 engages the elastomeric bushing 21, each bushing will be sufficiently strong to transmit the drive to the track chain 13, but it will nevertheless adjust to the sprocket 10 so that all of the sprocket teeth 11 which are adjacent a respective bushing 21 will engage that bushing and thereby achieve a full and firm drive between the sprocket 10 and the track chain 13. Of course the links 14 have the usual center webs 32 and the inner walls 33, both of which preclude endwise movement of the bushing 21 and thereby preclude escape of the bushing 21 from its secured position between the links 14.

FIG. 3 also shows, in the dot-dash line designated 34, the free body size of the elastomeric member 21 before it is compressed by the track plate 26 secured in the chain 13. Also, the profile of the sprocket 10 in the tooth spacing 12 includes the arcuate portion 21 and the tangentially extending side walls designated 36, and that is the profile of the bushing 21, as it is seen in FIG. 1 such that it has the arcuate portion and the tangentially extending portions respectively designated 24 and 37.

With this arrangement, there is no need for any screws or fasteners extending into the centrally located type of bushing member, such as the bushing 21, and the bushing is also of an elastomeric material which has the advantages mentioned herein.

What is claimed is:

1. A crawler tractor track chain drive assembly comprising a drive sprocket having teeth and spacings therebetween, a track chain including a plurality of track chain links disposed in pairs in end-to-end relation along said track chain and with each of said pairs being two of said chain links laterally spaced apart from each other, a track plate removably attached to each of said pairs of said links and extending thereover, a plurality of pins articularly connecting said pairs of said links together in a chain arrangement, each of said links including a flange extending toward the other of said links in the paired arrangement and with said flanges being spaced from each other in pairs and being spaced from the respective said track plate to present an opening at the central portion of each of said pairs of said links, and an elastomeric bushing member disposed in each of said openings and being of a size to extend in contact with each said pair of flanges and in contact with said track plate and thereby being secured in a fixed position on said track chain and being disposed in said sprocket spacings and thereby engaged by said sprocket teeth.

2. The crawler tractor track chain drive assembly as claimed in claim 1, wherein said flanges are arcuately shaped to present a concave surface faced toward said track plate, to thereby present a saddle for support of said elastomeric bushing member.

3. The crawler tractor track chain drive assembly as claimed in claim 1, wherein said elastomeric bushing member is of a dimension, in the direction between said flanges and said track plate, which is greater than the corresponding dimension of said opening, for compressing said elastomeric member between said flanges and said track plate.

4. The crawler tractor track chain drive assembly as claimed in claim 1, wherein said elastomeric bushing member includes a metal piece on the surface thereof and faced toward said sprocket to be contacted by said sprocket.

5. The crawler tractor track chain drive assembly as claimed in claim 1, wherein said elastomeric bushing member includes two metal pieces on the diametrically opposite surfaces thereof, for selective positioning of either of said pieces faced toward said sprocket to be contacted by said sprocket.

6. The crawler tractor track chain drive assembly as claimed in claim 5, wherein said flanges are arcuately shaped to present a concave surface faced toward said track plate, to thereby present a saddle for support of said elastomeric bushing member.

7. The crawler tractor track chain drive assembly as claimed in claim 1, wherein each of said sprocket spacings has a profile of an arcuate base and sides extending tangentially from said base to the crown of said teeth, and said elastomeric bushing member having a profile identical to said profile of said spacing, for matching therewith.

8. The crawler tractor track chain drive assembly as claimed in claim 1, wherein said elastomeric bushing member is retained in said opening by being compressed therein and being free of any screw or fastener of any type in contact with said elastomeric bushing member.

\* \* \* \* \*